United States Patent
Ono et al.

(10) Patent No.: US 12,304,245 B2
(45) Date of Patent: May 20, 2025

(54) TIRE RUBBER COMPOSITION AND PNEUMATIC TIRE

(71) Applicant: Sumitomo Rubber Industries, Ltd., Hyogo (JP)

(72) Inventors: Shuichiro Ono, Kobe (JP); Fumiya Kato, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 932 days.

(21) Appl. No.: 17/434,316

(22) PCT Filed: Feb. 26, 2020

(86) PCT No.: PCT/JP2020/007791
§ 371 (c)(1),
(2) Date: Mar. 1, 2022

(87) PCT Pub. No.: WO2020/179582
PCT Pub. Date: Sep. 10, 2020

(65) Prior Publication Data
US 2023/0202235 A1    Jun. 29, 2023

(30) Foreign Application Priority Data

Mar. 1, 2019    (JP) .................................. 2019-037706

(51) Int. Cl.
*B60C 11/03*        (2006.01)
*B60C 1/00*         (2006.01)
(Continued)

(52) U.S. Cl.
CPC ........ *B60C 1/0016* (2013.01); *B60C 11/0008* (2013.01); *B60C 11/03* (2013.01);
(Continued)

(58) Field of Classification Search
CPC combination set(s) only.
See application file for complete search history.

(56) References Cited

U.S. PATENT DOCUMENTS 4,745,150 A * 5/1988 Ida ........................ B60C 1/0016
524/505
5,385,969 A * 1/1995 Saito ....................... B60C 11/18
524/495

(Continued)

FOREIGN PATENT DOCUMENTS

CN      106079128 A    11/2016
EP      3 663 103 A1    6/2020
(Continued)

OTHER PUBLICATIONS

International Search Report issued in PCT/JP2020/007791; mailed May 19, 2020.

*Primary Examiner* — Peter A Salamon
(74) *Attorney, Agent, or Firm* — Studebaker Brackett PLLC (57) ABSTRACT

The present invention aims to provide tire rubber composition with significantly improved overall performance in terms of wet grip performance and fuel economy, and pneumatic tires including the rubber compositions. The tire rubber compositions of the present invention have a tan δ versus temperature curve whose peak tan δ and half width satisfy the following relationship (1):

Peak tan δ/Half width≥0.025        (1).

10 Claims, 1 Drawing Sheet

(51) Int. Cl.
  *B60C 11/00* (2006.01)
  *C08F 136/08* (2006.01)
  *C08L 9/06* (2006.01)
  *C08L 45/02* (2006.01)
  *C08L 47/00* (2006.01)

(52) U.S. Cl.
  CPC .............. *C08F 136/08* (2013.01); *C08L 9/06* (2013.01); *C08L 45/02* (2013.01); *C08L 47/00* (2013.01); *B60C 2011/0025* (2013.01); *B60C 2011/0033* (2013.01); *B60C 2011/0353* (2013.01); *B60C 2011/0355* (2013.01); *C08L 2205/03* (2013.01)

(56) References Cited

U.S. PATENT DOCUMENTS

| | | | | |
|---|---|---|---|---|
| 5,405,899 A | * | 4/1995 | Saito | B60C 1/0016 524/495 |
| 2014/0100316 A1 | * | 4/2014 | Washizu | C08F 12/08 526/337 |
| 2014/0200321 A1 | * | 7/2014 | Washizu | B60C 1/00 526/336 |
| 2018/0291188 A1 | * | 10/2018 | Washizu | C08F 236/10 |
| 2020/0369087 A1 | * | 11/2020 | Matsui | B60C 11/0008 |
| 2023/0202235 A1 | * | 6/2023 | Ono | B60C 1/0016 |

FOREIGN PATENT DOCUMENTS

| | | |
|---|---|---|
| JP | S52-135350 A | 11/1977 |
| JP | S62-143948 A | 6/1987 |
| JP | H03-220003 A | 9/1991 |
| JP | H03-239603 A | 10/1991 |
| JP | H03-275745 A | 12/1991 |
| JP | 2005-178478 A | 7/2005 |
| JP | 2014-061602 A | 4/2014 |
| JP | 2014-088544 A | 5/2014 |
| JP | 2015-054915 A | 3/2015 |
| JP | 2016-003308 A | 1/2016 |
| JP | 2016-088284 A | 5/2016 |
| JP | 2016-089051 A | 5/2016 |
| JP | 2017-047865 A | 3/2017 |
| JP | 2018-178103 A | 11/2018 |
| WO | 2018/122688 A1 | 7/2018 |
| WO | 2018/158418 A1 | 9/2018 |
| WO | 2019/039175 A1 | 2/2019 |
| WO | 2019/141667 A1 | 7/2019 |

* cited by examiner

TIRE RUBBER COMPOSITION AND PNEUMATIC TIRE

TECHNICAL FIELD

The present invention relates to tire rubber compositions and pneumatic tires.

BACKGROUND ART

Among the important properties required of tires are wet grip performance and fuel economy. It is desirable to simultaneously achieve these properties. For example, it has been proposed to enhance wet grip performance, e.g., by increasing the amount of filler. However, this increase tends to result in deteriorated fuel economy. Generally, it is difficult to achieve both wet grip performance and fuel economy.

SUMMARY OF INVENTION

Technical Problem

The present invention aims to solve the above problem and provide tire rubber compositions with significantly improved overall performance in terms of wet grip performance and fuel economy, and pneumatic tires including the rubber compositions.

Solution to Problem

The present invention relates to a tire rubber composition, having a tan δ versus temperature curve whose peak tan δ and half width satisfy the following relationship (1):

$$\text{Peak tan } \delta/\text{Half width} \geq 0.025 \tag{1}$$

The rubber composition preferably satisfies the following relationship:

$$0.025 \leq \text{Peak tan } \delta/\text{Half width} \leq 0.100.$$

The rubber composition preferably satisfies the following relationship:

$$0.027 \leq \text{Peak tan } \delta/\text{Half width} \leq 0.080.$$

The rubber composition preferably contains an isoprene-based rubber and a styrene-butadiene rubber.

The rubber composition preferably contains a farnesene polymer.

The rubber composition preferably contains a coumarone-indene resin.

The present invention also relates to a pneumatic tire, including the rubber composition.

The tire preferably has a maximum total tread thickness of 5 mm or more.

The tire preferably has a main tread groove depth of 8.0 to 13.0 mm.

The tire preferably has a main tread groove width of 6 to 16 mm.

The tire preferably has a maximum total subtread thickness at a main groove bottom of 0.5 to 2.0 mm.

Advantageous Effects of Invention

The tire rubber compositions of the present invention have a tan δ versus temperature curve whose peak tan δ and half width satisfy relationship (1). Thus, the rubber compositions provide significantly improved overall performance in terms of wet grip performance and fuel economy.

DESCRIPTION OF EMBODIMENTS

The tire rubber compositions (vulcanized rubber compositions) of the present invention have a tan δ versus temperature curve whose peak tan δ and half width satisfy the following relationship (1):

$$\text{Peak tan } \delta/\text{Half width} \geq 0.025 \tag{1}$$

A ratio of "Peak tan δ (the tan δ maximum in a tan δ versus temperature curve)" to "Half width (determined by subtracting the lower temperature at which the tan δ reaches half the tan δ maximum from the higher temperature at which the tan δ reaches half the tan δ maximum, FWHM)" (unit: 1/° C.) of not lower than the lower limit tends to lead to good overall performance in terms of wet grip performance and fuel economy. Preferably, Peak tan δ/Half width≥0.027, more preferably ≥0.029, still more preferably ≥0.030. The upper limit is not limited, but preferably Peak tan d/Half width≤0.100, more preferably ≤0.080, still more preferably ≤0.060.

The reason why the rubber compositions provide the above-mentioned advantageous effect is not exactly clear, but the effect is believed to be due to the following mechanism.

When rubber compositions have a tan δ versus temperature curve having a ratio of Peak tan d/Half width that satisfies relationship (1), they have properties such as a relatively high peak tan δ and a relatively sharp shape of the tan δ versus temperature curve. Such rubber compositions are believed to have effects such as enhanced wet grip performance due to the high tan δ peak, and improved wet grip performance and fuel economy due to the sharp shape. Therefore, it is believed that the rubber compositions provide significantly improved overall performance in terms of wet grip performance and fuel economy.

Thus, the present invention solves the problem (object) consisting in improving overall performance in terms of wet grip performance and fuel economy by a tire rubber composition having a structure satisfying the relationship (1): Peak tan δ/Half width≥0.025. In other words, relationship (1) does not define the problem (object), and the problem herein is to improve overall performance in terms of wet grip performance and fuel economy. In order to provide a solution to this problem, a structure satisfying relationship (1) has been devised.

A rubber composition satisfying relationship (1) may be prepared by a variety of techniques that can change the tan d. Examples of such techniques for satisfying relationship (1) include: (a) a method of incorporating an appropriate amount of a liquid polymer such as a farnesene polymer as a polymer component; (b) a method of incorporating an appropriate amount of a solid polymer such as a coumarone-indene resin as a polymer component; (c) a method of incorporating appropriate amounts of rubber components of different types, e.g., an isoprene-based rubber and a styrene-butadiene rubber; (d) a method of previously preparing a mixture of a rubber component and a polymer; and (e) a method of previously preparing a mixture of materials having the same or similar SP values, which methods may be used either individually or in appropriate combination.

In particular, a suitable method may include using a plurality of rubber components and a plurality of polymer components, previously mixing each set of the rubber and polymer components having the same or similar SP values to prepare a plurality of mixtures, and mixing the plurality of mixtures with other materials as needed. In this method, it is believed that the materials in each mixture are well compatible with one another, so that the overall performance in terms of wet grip performance and fuel economy can be significantly improved.

In the tan δ versus temperature curve of the rubber compositions (vulcanized rubber compositions), the peak tan δ preferably satisfies the following relationship (2):

$$\text{Peak tan } \delta \geq 0.80 \tag{2}$$

A peak tan δ of not lower than the lower limit tends to lead to good wet grip performance. More preferably, Peak tan δ≥1.00, still more preferably ≥1.05, particularly preferably ≥1.10. The upper limit is not limited, and the tan δ is desirably as high as possible.

In the tan δ versus temperature curve of the rubber compositions (vulcanized rubber compositions), the half width (° C.) preferably satisfies the following relationship (3):

$$\text{Half width} \leq 50° \text{ C.} \tag{3}$$

A half width of not higher than the upper limit tends to lead to good fuel economy. More preferably, Half width≤48° C., still more preferably ≤46° C., particularly preferably ≤44° C. The lower limit is not limited, and the half width is desirably as low as possible.

In the temperature curve of the rubber compositions (vulcanized rubber compositions), the tan δ peak temperature (° C.) preferably satisfies the following relationship (4):

$$-30° \text{ C.} \leq \text{Tan } \delta \text{ peak temperature} \leq 10° \text{ C.} \tag{4}$$

A tan δ peak temperature within the range indicated above tends to lead to good overall performance in terms of wet grip performance and fuel economy. More preferably -25° C.≤Tan δ peak temperature≤5° C., still more preferably -20° C.≤Tan δ peak temperature≤0° C.

A rubber composition satisfying relationships (2), (3), and/or (4) may be prepared as described for the techniques for satisfying relationship (1) or by other techniques.

In the tan δ versus temperature curve, there may be a plurality of peak tops. In this case, it is sufficient that at least one peak (curve) has a ratio of the peak tan δ to the half width of the curve including the peak that falls within the range indicated above. Moreover, with respect to at least one peak (curve), the peak tan δ, the half width of the curve including the peak, and the tan δ peak temperature suitably fall within the respective ranges indicated above.

The tan δ versus temperature curve can be measured as described later in EXAMPLES. The measured curve can be used to determine the peak tan δ, the half width, and the tan δ peak temperature.

Examples of rubber components include diene rubbers such as isoprene-based rubbers, polybutadiene rubber (BR), styrene-butadiene rubber (SBR), acrylonitrile-butadiene rubber (NBR), chloroprene rubber (CR), butyl rubber (IIR), and styrene-isoprene-butadiene copolymer rubber (SIBR). These diene rubbers may be used alone or in combinations of two or more. From the standpoints of wet grip performance and fuel economy, isoprene-based rubbers, BR, and SBR are preferred among these, with isoprene-based rubbers and/or SBR being more preferred.

In the rubber compositions which contain an isoprene-based rubber(s), the amount (total amount) of the isoprene-based rubber(s) based on 100% by mass of the total rubber components is preferably 5% by mass or more, more preferably 10% by mass or more, still more preferably 15% by mass or more, particularly preferably 25% by mass or more. When the amount is not less than the lower limit, good fuel economy tends to be obtained. The upper limit of the amount is not limited, but is preferably 60% by mass or less, more preferably 45% by mass or less, still more preferably 35% by mass or less, particularly preferably 30% by mass or less. When the amount is not more than the upper limit, the overall performance in terms of wet grip performance and fuel economy tends to be significantly improved.

Examples of isoprene-based rubbers include natural rubber (NR), polyisoprene rubber (IR), refined NR, modified NR, and modified IR. The NR may be one commonly used in the tire industry such as SIR20, RSS #3, or TSR20. Any IR may be used, and examples include those commonly used in the tire industry such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone or in combinations of two or more.

In the rubber compositions which contain SBR, the amount of the SBR based on 100% by mass of the total rubber components is preferably 10% by mass or more, more preferably 35% by mass or more, still more preferably 50% by mass or more, particularly preferably 55% by mass or more. When the amount is not less than the lower limit, good wet grip performance tends to be obtained. The upper limit of the amount is not limited, but is preferably 90% by mass or less, more preferably 80% by mass or less, still more preferably 70% by mass or less, particularly preferably 60% by mass or less. When the amount is not more than the upper limit, the overall performance in terms of wet grip performance and fuel economy tends to be significantly improved.

Any SBR may be used, and examples include emulsion-polymerized styrene-butadiene rubber (E-SBR) and solution-polymerized styrene-butadiene rubber (S-SBR). The SBR may be either nonmodified or modified SBR.

The modified SBR may be any SBR having a functional group interactive with filler such as silica. For example, it may be a chain end-modified SBR obtained by modifying at least one chain end of SBR with a compound (modifier) having the functional group (i.e., a chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a polyfunctional compound having two or more epoxy groups in the molecule so that a hydroxy or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted. Preferred among these are amino groups (preferably amino groups whose hydrogen atom is replaced with a C1-C6 alkyl group), alkoxy groups (preferably C1-C6 alkoxy groups), alkoxysilyl groups (preferably C1-C6 alkoxysilyl groups), and amide groups.

The modified SBR may suitably be, for example, SBR modified with a compound (modifier) represented by the following formula:

wherein $R^1$, $R^2$, and $R^3$ are the same or different and each represent an alkyl, alkoxy, silyloxy, acetal, carboxyl (—COOH), or mercapto (—SH) group or a derivative thereof; $R^4$ and $R^5$ are the same or different and each represent a hydrogen atom or an alkyl group, and $R^4$ and $R^5$ may be joined together to form a ring structure with the nitrogen atom; and n represents an integer.

The SBR modified with a compound (modifier) of the above formula may more suitably be a solution-polymerized styrene-butadiene rubber (S-SBR) having a polymerizing end (active terminal) modified with a compound of the above formula (e.g., the modified SBR disclosed in JP 2010-111753 A).

$R^1$, $R^2$, and $R^3$ may each suitably be an alkoxy group, preferably a C1-C8 alkoxy group, more preferably a C1-C4 alkoxy group. $R^4$ and $R^5$ may each suitably be an alkyl group, preferably a C1-C3 alkyl group. The integer n is preferably 1 to 5, more preferably 2 to 4, still more preferably 3. When $R^4$ and $R^5$ are joined together to form a ring structure with the nitrogen atom, the ring structure is preferably a 4- to 8-membered ring. The term "alkoxy group" encompasses cycloalkoxy (e.g., cyclohexyloxy) and aryloxy (e.g., phenoxy, benzyloxy) groups.

Specific examples of the modifier include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Preferred among these are 3-dimethylaminopropyltrimethoxysilane, 3-dimethylaminopropyltriethoxysilane, and 3-diethylaminopropyltrimethoxysilane. These may be used alone or in combinations of two or more.

Suitable examples of the modified SBR include SBR modified with the following compounds (modifiers), examples of which include: polyglycidyl ethers of polyhydric alcohols such as ethylene glycol diglycidyl ether, glycerol triglycidyl ether, trimethylolethane triglycidyl ether, and trimethylolpropane triglycidyl ether; polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene; epoxy group-containing tertiary amines such as 4,4'-diglycidyl-diphenylmethylamine and 4,4'-diglycidyl-dibenzylmethylamine; diglycidylamino compounds such as diglycidylaniline, N,N'-diglycidyl-4-glycidyloxyaniline, diglycidylorthotoluidine, tetraglycidyl metaxylenediamine, tetraglycidylaminodiphenylmethane, tetraglycidyl-p-phenylenediamine, diglycidylaminomethylcyclohexane, and tetraglycidyl-1,3-bisaminomethylcyclohexane;

amino group-containing acid chlorides such as bis(1-methylpropyl) carbamyl chloride, 4-morpholinecarbonyl chloride, 1-pyrrolidinecarbonyl chloride, N, N-dimethylcarbamic acid chloride, and N, N-diethylcarbamic acid chloride; epoxy group-containing silane compounds such as 1,3-bis(glycidyloxypropyl)-tetramethyldisiloxane and (3-glycidyloxypropyl)-pentamethyldisiloxane;

sulfide group-containing silane compounds such as (trimethylsilyl) [3-(trimethoxysilyl)propyl]sulfide, (trimethylsilyl) [3-(triethoxysilyl)propyl]sulfide, (trimethylsilyl) [3-(tripropoxysilyl)propyl]sulfide, (trimethylsilyl) [3-(tributoxysilyl)propyl]sulfide, (trimethylsilyl) [3-(methyldimethoxysilyl)propyl]sulfide, (trimethylsilyl) [3-(methyldiethoxysilyl)propyl]sulfide, (trimethylsilyl) [3-(methyldipropoxysilyl)propyl]sulfide, and (trimethylsilyl) [3-(methyldibutoxysilyl)propyl]sulfide;

N-substituted aziridine compounds such as ethyleneimine and propyleneimine; alkoxysilanes such as methyltriethoxysilane, N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, and N,N-bis(trimethylsilyl)aminoethyltriethoxysilane; (thio)benzophenone compounds containing amino and/or substituted amino groups such as 4-N,N-dimethylaminobenzophenone, 4-N,N-di-t-butylaminobenzophenone, 4-N,N-diphenylaminobenzophenone, 4,4'-bis(dimethylamino)benzophenone, 4,4'-bis(diethylamino)benzophenone, 4,4'-bis(diphenylamino)benzophenone, and N, N,N',N'-bis(tetraethylamino)benzophenone; benzaldehyde compounds containing amino and/or substituted amino groups such as 4-N,N-dimethylaminobenzaldehyde, 4-N,N-diphenylaminobenzaldehyde, and 4-N,N-divinylaminobenzaldehyde; N-substituted pyrrolidones such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone; N-substituted piperidones such as N-methyl-2-piperidone, N-vinyl-2-piperidone, and N-phenyl-2-piperidone; and N-substituted lactams such as N-methyl-ε-caprolactam, N-phenyl-ε-caprolactam, N-methyl-ω-laurilolactam, N-vinyl-ω-laurilolactam, N-methyl-β-propiolactam, and N-phenyl-β-propiolactam; as well as N,N-bis(2,3-epoxypropoxy) aniline, 4,4-methylene-bis (N, N-glycidylaniline), tris(2,3-epoxypropyl)-1,3,5-triazine-2,4,6-triones, N, N-diethylacetamide, N-methylmaleimide, N, N-diethylurea, 1,3-dimethylethylene urea, 1,3-divinylethylene urea, 1,3-diethyl-2-imidazolidinone, 1-methyl-3-ethyl-2-imidazolidinone, 4-N,N-dimethylaminoacetophenone, 4-N,N-diethylaminoacetophenone, 1,3-bis (diphenylamino)-2-propanone, and 1,7-bis (methylethylamino)-4-heptanone. Preferred among these is SBR modified with alkoxysilanes.

The modification with these compounds (modifiers) can be performed by known methods.

SBR products manufactured or sold by Sumitomo Chemical Co., Ltd., JSR Corporation, Asahi Kasei Corporation, Zeon Corporation, etc. may be used as the SBR. A single type or a combination of two or more types of SBR may be used.

The rubber compositions preferably contain carbon black. The amount of the carbon black per 100 parts by mass of the total rubber components is preferably 1 part by mass or more, more preferably 3 parts by mass or more, still more preferably 10 parts by mass or more. The amount is preferably 30 parts by mass or less, more preferably 20 parts by mass or less, still more preferably 15 parts by mass or less. When the amount is within the range indicated above, good wet grip performance and fuel economy tend to be obtained.

Any carbon black may be used, and examples include furnace black (furnace carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; and graphite. These may be used alone or in combinations of two or more.

To obtain good wet grip performance and fuel economy, the carbon black preferably has a nitrogen adsorption specific surface area ($N_2SA$) of 50 $m^2/g$ or more, more preferably 80 $m^2/g$ or more, but preferably 200 $m^2/g$ or less, more preferably 150 $m^2/g$ or less. For the same reason, the carbon black preferably has a dibutyl phthalate (DBP) absorption of 50 mL/100 g or more, more preferably 80 mL/100 g or more, but preferably 200 mL/100 g or less, more preferably 150 mL/100 g or less.

Herein, the nitrogen adsorption specific surface area of the carbon black is measured in accordance with ASTM D4820-93, while the DBP absorption is measured in accordance with ASTM D2414-93.

Any carbon black may be used, and examples include N 134, N110, N220, N234, N219, N339, N330, N326, N351, N550, and N762. For example, commercial products of Asahi Carbon Co., Ltd., Cabot Japan K.K., Tokai Carbon Co., Ltd., Mitsubishi Chemical Corporation, Lion Corporation, NSCC Carbon Co., Ltd, Columbia Carbon, etc. may be used. These may be used alone or in combinations of two or more.

The rubber compositions preferably contain silica. Examples of the silica include dry silica (anhydrous silica) and wet silica (hydrous silica). Wet silica is preferred among these because it has a large number of silanol groups.

The amount of the silica per 100 parts by mass of the total rubber components is preferably 10 parts by mass or more, more preferably 30 parts by mass or more, still more preferably 50 parts by mass or more, particularly preferably 60 parts by mass or more. When the amount is not less than the lower limit, good wet grip performance and fuel economy tend to be obtained. The amount is preferably 150 parts by mass or less, more preferably 100 parts by mass or less, still more preferably 80 parts by mass or less. When the amount is not more than the upper limit, good dispersion tends to be obtained.

The silica preferably has a nitrogen adsorption specific surface area ($N_2SA$) of 40 $m^2/g$ or more, more preferably 70 $m^2/g$ or more, still more preferably 110 $m^2/g$ or more. When the $N_2SA$ is not less than the lower limit, good wet grip performance and fuel economy tend to be obtained. The $N_2SA$ of the silica is also preferably 220 $m^2/g$ or less, more preferably 200 $m^2/g$ or less. When the $N_2SA$ is not more than the upper limit, good dispersion tends to be obtained.

The $N_2SA$ of the silica is measured by the BET method in accordance with ASTM D3037-93.

The silica may be commercially available from Degussa, Rhodia, Tosoh Silica Corporation, Solvay Japan, Tokuyama Corporation, etc.

The rubber compositions preferably contain a silane coupling agent together with silica.

Any silane coupling agent may be used, and examples include sulfide silane coupling agents such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. To better achieve the advantageous effect of the present invention, sulfide or mercapto silane coupling agents are preferred among these.

The silane coupling agent may be commercially available from Degussa, Momentive, Shin-Etsu Silicone, Tokyo Chemical Industry Co., Ltd., AZmax. Co., Dow Corning Toray Co., Ltd., etc.

The amount of the silane coupling agent per 100 parts by mass of the silica is preferably 3 parts by mass or more, more preferably 5 parts by mass or more. When the amount is 3 parts by mass or more, the effect of the addition tends to be obtained. The amount is also preferably 25 parts by mass or less, more preferably 20 parts by mass or less. When the amount is 25 parts by mass or less, an effect commensurate with the added amount and good processability during kneading tend to be provided.

To significantly improve overall performance in terms of wet grip performance and fuel economy, the total amount of fillers (carbon black, silica, etc.) per 100 parts by mass of the total rubber components is preferably 30 to 120 parts by mass, more preferably 40 to 100 parts by mass, still more preferably 50 to 80 parts by mass, particularly preferably 50 to 70 parts by mass.

From the standpoint of overall performance in terms of wet grip performance and fuel economy, the rubber compositions preferably contain polymer components (resin components) such as liquid or solid polymers.

The term "liquid polymers" refers to polymers that are liquid at room temperature (25° C.). The term "solid polymers" refers to polymers that are solid at room temperature (25° C.). Examples of the liquid and solid polymers include farnesene polymers, liquid diene polymers, styrene resins, coumarone-indene resins, terpene resins, p-t-butylphenol acetylene resins, and acrylic resins. From the standpoint of overall performance in terms of wet grip performance and fuel economy, polymers such as farnesene polymers or coumarone-indene resins are suitable among these.

The term "farnesene polymers" refers to polymers produced by polymerizing farnesene and contains a structural unit derived from farnesene. Farnesene exists in isomeric forms, including α-farnesene ((3E, 7E)-3,7,11-trimethyl-1,3,6,10-dodecatetraene) and β-farnesene (7,11-dimethyl-3-methylene-1,6,10-dodecatriene). Preferred is (E)-β-farnesene having the following structure:

The farnesene polymers may be homopolymers of farnesene (farnesene homopolymers) or copolymers of farnesene with vinyl monomers (farnesene-vinyl monomer copolymers).

Examples of the vinyl monomers include aromatic vinyl compounds such as styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N, N-dimethylaminoethylstyrene, N, N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, and tertiary amino group-containing diphenylethylene; and conjugated diene compounds such as butadiene and isoprene. These may be used alone or in combinations of two or more. Butadiene is preferred among these. In other words, preferred farnesene-vinyl monomer copolymers are copolymers of farnesene and butadiene (farnesene-butadiene copolymers).

Liquid farnesene polymers are suitable as the farnesene polymers. The term "liquid farnesene polymers" refers to farnesene polymers that are liquid at room temperature (25° C.), and may suitably have a weight average molecular weight (Mw) of 3000 to 300,000. The Mw of the liquid farnesene polymers is preferably 8000 or more, more preferably 10,000 or more, but is preferably 100,000 or less, more preferably 60,000 or less, still more preferably 50,000 or less.

The glass transition temperature (Tg) of the farnesene polymers is preferably −100° C. or higher, more preferably −78° C. or higher, but is preferably −10° C. or lower, more preferably −30° C. or lower, still more preferably −54° C. or lower. When the Tg is within the range indicated above, the advantageous effect of the present invention tends to be better achieved.

Herein, the Tg is measured using a differential scanning calorimeter (Q200, TA Instruments Japan) at a temperature increase rate of 10° C./min in accordance with JIS-K7121: 1987.

The melt viscosity of the farnesene polymers is preferably 0.1 Pa·s or higher, more preferably 0.7 Pa·s or higher, but is preferably 500 Pa·s or lower, more preferably 100 Pa·s or lower, still more preferably 13 Pa·s or lower. When the melt viscosity is within the range indicated above, the advantageous effect of the present invention tends to be better achieved.

Herein, the melt viscosity is measured at 38° C. using a Brookfield-type viscometer (BROOKFIELD ENGINEERING LABS. INC.).

The copolymerization ratio of farnesene to vinyl monomers (farnesene/vinyl monomers) of the farnesene-vinyl monomer copolymers is preferably 40/60 to 90/10 by mass.

The amount of the farnesene polymers per 100 parts by mass of the total rubber components is preferably 1.0 part by mass or more, more preferably 5.0 parts by mass or more, still more preferably 7.0 parts by mass or more, particularly preferably 7.5 parts by mass, most preferably 8.5 parts by mass or more, but is preferably 50.0 parts by mass or less, more preferably 30.0 parts by mass or less, still more preferably 20.0 parts by mass or less, particularly preferably 14.0 parts by mass or less, most preferably 12.0 parts by mass or less, still most preferably 10.0 parts by mass or less. When the amount is within the range indicated above, good overall performance in terms of wet grip performance and fuel economy tends to be obtained.

The farnesene polymers may be commercially available from Kuraray Co., Ltd., etc.

The polystyrene equivalent weight average molecular weight (Mw) of the liquid diene polymers is preferably $1.0 \times 10^3$ to $2.0 \times 10^5$, more preferably $3.0 \times 10^3$ to $1.5 \times 10^4$, as measured by gel permeation chromatography (GPC).

Herein, the Mw of the liquid diene polymers is measured by gel permeation chromatography (GPC) and calibrated with polystyrene standards.

Examples of the liquid diene polymers include liquid styrene-butadiene copolymers (liquid SBR), liquid polybutadiene polymers (liquid BR), liquid polyisoprene polymers (liquid IR), and liquid styrene-isoprene copolymers (liquid SIR).

The amount of the liquid polymers (the combined amount of liquid farnesene polymers, liquid diene polymers, and other liquid polymers) per 100 parts by mass of the total rubber components is preferably 1 part by mass or more, more preferably 5 parts by mass or more, still more preferably 7 parts by mass or more, particularly preferably 7.5 parts by mass, most preferably 8.5 parts by mass or more, but is preferably 50 parts by mass or less, more preferably 30 parts by mass or less, still more preferably 20 parts by mass or less, particularly preferably 14.0 parts by mass or less, most preferably 12.0 parts by mass or less, still most preferably 10.0 parts by mass or less. When the amount is within the range indicated above, good overall performance in terms of wet grip performance and fuel economy tends to be obtained.

The term "coumarone-indene resins" refers to resins that contain coumarone and indene as monomer components constituting the backbone (main chain) of the resins. Examples of monomer components which may be contained in the backbone in addition to coumarone and indene include styrene, α-methylstyrene, methylindene, and vinyltoluene.

The amount of the coumarone-indene resins per 100 parts by mass of the total rubber components is preferably 1.0 part by mass or more, more preferably 3.0 parts by mass or more, still more preferably 3.5 parts by mass or more, particularly preferably 5.0 parts by mass or more, most preferably 5.5 parts by mass or less, but is preferably 50.0 parts by mass or less, more preferably 30.0 parts by mass or less, still more preferably 20.0 parts by mass or less, particularly preferably 10.0 parts by mass or less, most preferably 9.0 parts by mass or less, still most preferably 7.5 parts by mass or less. When the amount is within the range indicated above, good overall performance in terms of wet grip performance and fuel economy tends to be obtained.

The hydroxy value (OH value) of the coumarone-indene resins is preferably 15 mg KOH/g or higher, more preferably 30 mg KOH/g or higher. The OH value is also preferably 150 mg KOH/g or lower, more preferably 100 mg KOH/g or lower.

The OH value refers to the amount of potassium hydroxide in milligrams required to neutralize the acetic acid which combines with hydroxy groups on acetylation of 1 g of the resin, and is measured by potentiometric titration (JIS K 0070:1992).

The softening point of the coumarone-indene resins is preferably 30° C. or higher, more preferably 60° C. or higher, still more preferably 80° C. or higher. When the softening point is 30° C. or higher, desired wet grip performance tends to be obtained. The softening point is also preferably 160° C. or lower, more preferably 130° C. or lower, still more preferably 120° C. or lower. Resins having a softening point of 160° C. or lower tend to disperse well, resulting in improved wet grip performance and fuel economy.

The softening point is determined in accordance with JIS K 6220-1:2001 with a ring and ball softening point measuring apparatus and defined as the temperature at which the ball drops down.

The term "styrene resins" refer to polymers formed from styrene monomers as structural monomers, and examples include polymers polymerized from styrene monomers as main components (at least 50% by mass). Specific examples include homopolymers polymerized from single styrene monomers (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene), copolymers copolymerized from two or more styrene monomers, and copolymers of styrene monomers with additional monomers copolymerizable therewith.

Examples of the additional monomers include acrylonitriles such as acrylonitrile and methacrylonitrile; unsaturated carboxylic acids such as acrylic and methacrylic acid; unsaturated carboxylic acid esters such as methyl acrylate and methyl methacrylate; dienes such as chloroprene, butadiene, and isoprene; olefins such as 1-butene and 1-pentene; and α,β-unsaturated carboxylic acids and acid anhydrides thereof such as maleic anhydride.

Preferred among these are α-methylstyrene resins (e.g., α-methylstyrene homopolymers, copolymers of α-methylstyrene and styrene).

Examples of the terpene resins include polyterpene, terpene phenol, and aromatic modified terpene resins.

The term "polyterpene" refers to resins produced by polymerization of terpene compounds, or hydrogenated product of such resins. The term "terpene compounds" refers to hydrocarbons having a composition represented by $(C_5H_8)_n$ or oxygen-containing derivatives thereof, which have a terpene backbone and are classified into monoterpenes $(C_{10}H_{16})$, sesquiterpenes $(C_{15}H_{24})$, diterpenes $(C_{20}H_{32})$, and other terpenes. Examples of such terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include terpene resins made from the above-mentioned terpene compounds, such as α-pinene resins, β-pinene resins, limonene resins, dipentene resins, and β-pinene-limonene resins, as well as hydrogenated terpene resins obtained by hydrogenation of the foregoing terpene resins.

Examples of the terpene phenol resins include resins produced by copolymerization of the above-mentioned terpene compounds and phenolic compounds, and resins obtained by hydrogenation of these resins. Specific examples include resins produced by condensation of the above-mentioned terpene compounds, phenolic compounds, and formaldehyde. Examples of the phenolic compounds include phenol, bisphenol A, cresol, and xylenol.

Examples of the aromatic modified terpene resins include resins obtained by modification of terpene resins with aromatic compounds, and resins obtained by hydrogenation of these resins. The aromatic compounds may be any compound having an aromatic ring, and examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes; coumarone, and indene.

Examples of the p-t-butylphenol acetylene resins include resins produced by condensation of p-t-butylphenol and acetylene.

Any acrylic resin may be used, but solvent-free acrylic resins are suitable because the resulting resins contain little impurities and have a sharp molecular weight distribution.

Examples of the solvent-free acrylic resins include (meth)acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, and annual research report TREND 2000 issued by Toagosei Co., Ltd., vol. 3, pp. 42-45) using no or minimal amounts of auxiliary raw materials such as polymerization initiators, chain transfer agents, and organic solvents. Herein, the term "(meth)acrylic" means methacrylic and acrylic.

The acrylic resins are preferably substantially free of auxiliary raw materials such as polymerization initiators, chain transfer agents, and organic solvents. The acrylic resins are also preferably those produced by continuous polymerization and having a relatively narrow compositional distribution or molecular weight distribution.

As described above, preferably the acrylic resins are substantially free of auxiliary raw materials such as polymerization initiators, chain transfer agents, and organic solvents, namely are of high purity. The purity of the acrylic resins (the resin content of the resins) is preferably 95% by mass or more, more preferably 97% by mass or more.

Examples of the monomer components of the acrylic resins include (meth)acrylic acids and (meth)acrylic acid derivatives such as (meth)acrylic acid esters (e.g., alkyl esters, aryl esters, aralkyl esters), (meth)acrylamides, and (meth)acrylamide derivatives.

In addition to the (meth)acrylic acids or (meth)acrylic acid derivatives, aromatic vinyls, such as styrene, «-methylstyrene, vinyltoluene, vinylnaphthalene, divinylbenzene, trivinylbenzene, or divinylnaphthalene, may also be used as monomer components of the acrylic resins.

The acrylic resins may be formed only of (meth)acrylic components or may further contain constituent components other than (meth)acrylic components.

Moreover, the acrylic resins may contain a hydroxy group, a carboxyl group, a silanol group, or other groups.

The amount of the solid polymers (the combined amount of solid coumarone-indene resins and other solid polymers) per 100 parts by mass of the total rubber components is preferably 1.0 part by mass or more, more preferably 3.0 parts by mass or more, still more preferably 3.5 parts by mass or more, particularly preferably 5.0 parts by mass or more, most preferably 5.5 parts by mass or less, but is preferably 50.0 parts by mass or less, more preferably 30.0 parts by mass or less, still more preferably 20.0 parts by mass or less, particularly preferably 10.0 parts by mass or less, most preferably 9.0 parts by mass or less, still most preferably 7.5 parts by mass or less. When the amount is within the range indicated above, good overall performance in terms of wet grip performance and fuel economy tends to be obtained.

The polymer components such as liquid or solid polymers may be commercially available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., Taoka Chemical Co., Ltd, etc.

The rubber compositions preferably contain an oil.

From the standpoints of properties such as wet grip performance, the amount of the oil per 100 parts by mass of the total rubber components is preferably 1.0 part by mass or more, more preferably 2.0 parts by mass or more, still more preferably 2.5 parts by mass or more. From the standpoint of fuel economy, the upper limit of the amount is preferably 10.0 parts by mass or less, more preferably 7.0 parts by mass or less, still more preferably 5.0 parts by mass or less.

The amount of the oil includes the amount of the oils contained in the rubbers (oil extended rubbers), if used.

Examples of the oil include process oils, plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. To better achieve the advantageous effect of the present invention, naphthenic process oils are preferred among these.

The oil may be commercially available from Idemitsu Kosan Co., Ltd., Sankyo Yuka Kogyo K. K., Japan Energy Corporation, Olisoy, H&R, Hokoku Corporation, Showa Shell Sekiyu K. K., Fuji Kosan Co., Ltd., etc.

The rubber compositions preferably contain an amide compound.

The amount of the amide compound per 100 parts by mass of the total rubber components is preferably 0.1 parts by mass or more, more preferably 1.0 part by mass or more, but is preferably 10.0 parts by mass or less, more preferably 7.0 parts by mass or less, still more preferably 5.0 parts by mass or less. When the amount is within the range indicated above, the overall performance in terms of wet grip performance and fuel economy tends to be significantly improved. Herein, when the amide compound is used in the form of a mixture containing a fatty acid metal salt with the amide compound, the amount of the amide compound includes the amount of the fatty acid metal salt.

Any amide compound may be used, and examples include fatty acid amides and fatty acid amide esters. These amide compounds may be used alone or in combinations of two or more. Among these, fatty acid amides are preferred, and mixtures of fatty acid amides and fatty acid amide esters are more preferred.

The fatty acid amides may be saturated or unsaturated fatty acid amides. Examples of the saturated fatty acid amides include stearamide and behenamide. Examples of the unsaturated fatty acid amides include oleamide and erucamide. Preferred among these are unsaturated fatty acid amides, with oleamide being more preferred.

The fatty acid amide esters may be saturated or unsaturated fatty acid amide esters. Examples of the saturated fatty acid amide esters include stearic acid amide esters and behenic acid amide esters. Examples of the unsaturated fatty acid amide esters include oleic acid amide esters and erucic acid amide esters. These may be used alone or in combinations of two or more. Preferred among these are unsaturated fatty acid amide esters, with oleic acid amide esters being more preferred.

The amide compound may also suitably be in the form of a mixture of an amide compound and a fatty acid metal salt. Examples of the metal of the fatty acid metal salt include potassium, sodium, magnesium, calcium, barium, zinc, nickel, and molybdenum. Preferred among these are alkaline earth metals such as calcium and zinc, with calcium being more preferred.

The fatty acid of the fatty acid metal salt may be a saturated or unsaturated fatty acid. Examples of the saturated fatty acid include decanoic acid, dodecanoic acid, and stearic acid. Examples of the unsaturated fatty acid include oleic acid and elaidic acid. Among these, the fatty acid is preferably a saturated fatty acid, more preferably stearic acid. Moreover, the unsaturated fatty acid is preferably oleic acid.

The amide compound may be commercially available from NOF Corporation, Struktol, Lanxess, etc.

The rubber compositions preferably contain a wax.

From the standpoint of overall performance in terms of braking performance on ice and tensile strength, the amount of the wax per 100 parts by mass of the total rubber components is preferably 0.5 to 20 parts by mass, more preferably 1.0 to 10 parts by mass.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Preferred among these are petroleum waxes, with paraffin waxes being more preferred.

The wax may be commercially available from Ouchi Shinko Chemical Industrial Co., Ltd., Nippon Seiro Co., Ltd., Seiko Chemical Co., Ltd., etc.

The rubber compositions preferably contain an antioxidant.

From the standpoint of overall performance in terms of braking performance on ice and tensile strength, the amount of the antioxidant per 100 parts by mass of the total rubber components is preferably 1 to 10 parts by mass, more preferably 2 to 7 parts by mass.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3', 5'-di-t-butyl-4'-hydroxyphenyl) propionate] methane. These may be used alone or in combinations of two or more. Preferred among these are p-phenylenediamine and/or quinoline antioxidants, with N-(1,3-dimethylbutyl)-N'-phenyl-p-phenylenediamine and/or 2,2,4-trimethyl-1,2-dihydroquinoline polymer being more preferred.

The antioxidant may be commercially available from Seiko Chemical Co., Ltd., Sumitomo Chemical Co., Ltd., Ouchi Shinko Chemical Industrial Co., Ltd., Flexsys, etc.

The rubber compositions preferably contain stearic acid. From the standpoint of overall performance in terms of braking performance on ice and tensile strength, the amount of the stearic acid per 100 parts by mass of the total rubber components is preferably 0.5 to 10.0 parts by mass, more preferably 1.0 to 5.0 parts by mass.

The stearic acid may be a conventional one, e.g., available from NOF Corporation, Kao Corporation, FUJIFILM Wako Pure Chemical Corporation, or Chiba Fatty Acid Co., Ltd.

The rubber compositions preferably contain zinc oxide. The amount of the zinc oxide per 100 parts by mass of the total rubber components is preferably 0.5 to 10 parts by mass, more preferably 1 to 5 parts by mass.

The zinc oxide may be a conventional one, e.g., available from Mitsui Mining δ Smelting Co., Ltd., Toho Zinc Co., Ltd., HakusuiTech Co., Ltd., Seido Chemical Industry Co., Ltd., or Sakai Chemical Industry Co., Ltd.

The rubber compositions preferably contain a vulcanizing agent such as sulfur.

From the standpoint of overall performance in terms of wet grip performance and fuel economy, the amount of the sulfur per 100 parts by mass of the total rubber components is preferably 0.1 to 10.0 parts by mass, more preferably 0.5 to 5.0 parts by mass, still more preferably −0.7 to 3.0 parts by mass.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa sulfur Co., Ltd., Shikoku Chemicals Corporation, Flexsys, Nippon Kanryu Industry Co., Ltd., Hosoi Chemical Industry Co., Ltd., etc.

The rubber compositions preferably contain a vulcanizing accelerator.

From the standpoint of overall performance in terms of wet grip performance and fuel economy, the amount of the vulcanization accelerator per 100 parts by mass of the total rubber components is preferably 0.3 to 7.0 parts by mass, more preferably 1.0 to 5.0 parts by mass, still more preferably 1.5 to 4.5 parts by mass.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl) thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. From the standpoint of overall performance in terms of braking performance on ice and tensile strength, sulfenamide and/or guanidine vulcanization accelerators are preferred among these.

The rubber compositions can be prepared by usual methods. Specifically, the rubber compositions may be prepared by kneading the above-described components in a Banbury mixer, a kneader, an open roll mill, or other devices, and vulcanizing the kneaded mixture.

In particular, the rubber compositions may be preferably prepared by a method that includes a base kneading step of kneading a mixture of a rubber component and a polymer component 1 with a filler; and a final kneading step of kneading the kneaded mixture obtained in the base kneading step with a vulcanizing agent.

The mixture used in the base kneading step may be prepared through a step of kneading at least a rubber component and a polymer component. The kneading may be carried out by any method, such as by mixing using a known (internal) kneading machine such as a Banbury mixer, a kneader, or an open roll mill. The same kneading method may also be used in the kneading step described below.

The kneading conditions in the kneading step for preparing the mixture may be selected appropriately according to the type of kneading machine, rotation rate, and other factors, but the kneading temperature is usually 50 to 200° C., preferably 80 to 190° C., and the kneading time is usually 30 seconds to 30 minutes, preferably 1 to 30 minutes.

When a plurality of rubber components and a plurality of polymer components are to be used, it is preferred to select sets of rubber and polymer components with no or only slight differences in solubility parameter (SP value) to prepare a plurality of mixtures containing each set (for example, a mixture 1 containing a rubber component 1 and a polymer component 1 between which there are no or only slight differences in SP value, a mixture 2 containing a rubber component 2 and a polymer component 2 between which there are no or only slight differences in SP value). For example, the differences in solubility parameter (SP value) between the rubber and polymer components in each mixture are suitably as small as possible, preferably 1.5 or smaller, more preferably 1.0 or smaller, still more preferably 0.8 or smaller, particularly preferably 0.4 or smaller, most preferably 0.0 (zero). In such cases, the rubber and polymer components are well compatible with one another, so that the overall performance in terms of wet grip performance and fuel economy tends to be improved. Moreover, the lower limit of the differences in SP value is not limited, and is preferably as small as possible.

The SP values of the rubber and polymer components refer to solubility parameters calculated by the Hoy method using the structure of the compounds. The Hoy method is a calculation method as described in, for example, K. L. Hoy, "Table of Solubility Parameters", Solvent and Coatings Materials Research and Development Department, Union Carbites Corp. (1985).

For example, a rubber composition having excellent overall performance in terms of wet grip performance and fuel economy may be provided by previously preparing a mixture 1 of NR (SP value: 8.1) as a rubber component 1 and a farnesene polymer (SP value: 8.1) as a polymer component 1, and a mixture 2 of SBR (SP value: 8.5) as a rubber component 2 and a coumarone-indene resin (SP value: 9.1) as a polymer component 2, and then kneading the mixture 1, mixture 2, and a filler, and optionally other components in a base kneading step.

In the base kneading step, the mixtures and a filler may be kneaded.

The kneading conditions in the base kneading step may be selected appropriately according to the type of kneading machine, rotation rate, and other factors, but the kneading temperature is usually 50 to 200° C., preferably 80 to 190° C., and the kneading time is usually 30 seconds to 30 minutes, preferably 1 to 30 minutes.

In addition to the above-mentioned components, compounding agents conventionally used in the rubber industry, including, for example, softeners such as oils, stearic acid, zinc oxide, various antioxidants, and waxes, may be appropriately added and kneaded as needed in the base kneading step.

In a final kneading step, the kneaded mixture obtained in the base kneading step and a vulcanizing agent may be kneaded. The kneading conditions in the final kneading step may be selected appropriately according to the type of kneading machine, rotation rate, and other factors, but the kneading temperature is usually not higher than 100° C., preferably from room temperature to 80° C. The kneading time may be appropriately selected.

In addition to the above-mentioned components, components such as vulcanization accelerators and zinc oxide may be appropriately added and kneaded as needed in the final kneading step.

The preparation of an unvulcanized rubber composition in the final kneading step is usually followed by a vulcanization step of vulcanizing the unvulcanized rubber composition obtained in the final kneading step. The vulcanization step may be performed using a known vulcanizing means. The vulcanization temperature is usually 120 to 200° C., preferably 140 to 180° C. The vulcanization time may be appropriately selected.

The rubber compositions are suitable for use in treads (cap treads). They may also be used in other tire components, such as sidewalls, base treads, undertreads, clinch apexes, bead apexes, breaker cushion rubbers, rubbers for carcass cord topping, insulations, chafers, and innerliners, as well as side reinforcement layers of run-flat tires.

The pneumatic tires can be produced from the rubber compositions by usual methods.

Specifically, an unvulcanized rubber composition containing the components may be extruded and processed into the shape of a tire component such as a tread and then assembled with other tire components in a tire building machine in a usual manner to build an unvulcanized tire, which may then be heated and pressurized in a vulcanizer to produce a tire.

The pneumatic tires can be suitably used as various tires, including, for example, tires for passenger cars, tires for heavy duty vehicles such as trucks and buses, tires for two-wheeled vehicles, and racing tires.

From the standpoint of overall performance in terms of wet grip performance and fuel economy, the pneumatic tires preferably have a largest total tread thickness (hereinafter, also referred to as "maximum total tread thickness") of 5.0 mm or more. The maximum total tread thickness is more preferably 8.0 mm or more, still more preferably 9.0 mm or more, particularly preferably 10.0 mm or more. The upper limit is preferably 17.0 mm or less, more preferably 14.5 mm or less, still more preferably 13.0 mm or less.

Figure 1:
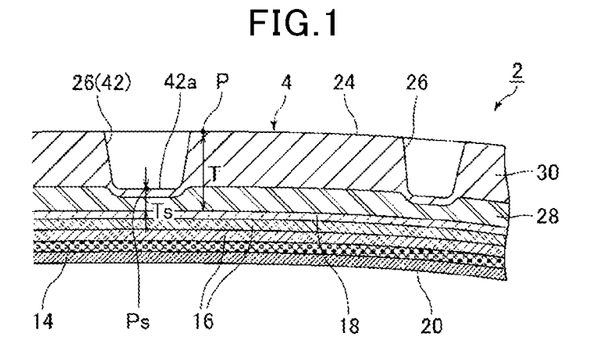
FIG. 1 is an enlarged cross-sectional view showing a tread 4 and its vicinity in a tire 2.

FIG. 1 shows an exemplary enlarged cross-sectional view showing a tread 4 and its vicinity in a tire 2. In the tire 2, the maximum total tread 4 thickness refers to the sum of the thicknesses of all rubber layers disposed radially outward from a cord layer (e.g., a band layer, a belt layer) disposed radially outermost in the tire. In the tire 2 of FIG. 1 including the tread 4 (a base layer 28 and a cap layer 30), a band 18, a belt 16, a carcass 14, and an innerliner 20, it is the maximum total thickness of the tread 4 consisting of the base and cap layers 28 and 30 disposed radially outward of the band 18 in the tire.

In FIG. 1, the vertical direction corresponds to the radial direction of the tire 2, the horizontal direction corresponds to the axial direction of the tire 2, and the direction perpendicular to this paper corresponds to the circumferential direction of the tire 2. In FIG. 1, the symbol P denotes a point on a tread surface 24. The double-sided arrow T denotes the total thickness of the tread 4 measured at the point P. The total thickness T is the sum of the thicknesses of the cap and base layers 30 and 28 measured at the point P. The total thickness T is measured along the normal of the tread surface 24 at the point P. FIG. 1 shows an example of a two-layered tread 4 consisting of a cap layer 30 and a base layer 28; however, in the case of a monolayer tread 4, the total thickness T of the tread is the thickness of the monolayer tread measured at the point P, while in the case of a three or more layered tread, the total thickness T of the tread is the sum of the thicknesses of the three or more layers measured at the point P, wherein the total thickness T at the point P is also measured along the normal of the tread surface 24 at the point P.

Moreover, in FIG. 1, the maximum total thickness of the tread 4 is the largest one among the total tread thicknesses (in FIG. 1, the sums of the thicknesses of the cap and base layers 30 and 28) measured at each point on the tread surface 24. It is preferably 5.0 mm or less.

The tire 2 of FIG. 1 has a plurality of grooves 26, among which a groove 42 is a main groove. Herein, the term "main groove" refers to the widest (widest in the tire width direction) groove among the grooves provided along the tire circumferential direction. When there are two or more widest grooves, it refers to the one closer to the widthwise center of the tire. When two grooves correspond to such main grooves, or in other words when there are two such main grooves located at the same distance from the widthwise center of the tire, the main groove refers to the deeper one. From the standpoint of overall performance in terms of wet grip performance and fuel economy, the depth of the main groove 42 (main groove depth) in the tire 2 is preferably 13.0 mm or less, more preferably 12.0 mm or less, still more preferably 11.5 mm or less, but is preferably 3.5 mm or more, more preferably 6.0 mm or more, still more preferably 8.0 mm or more.

Figure 2:
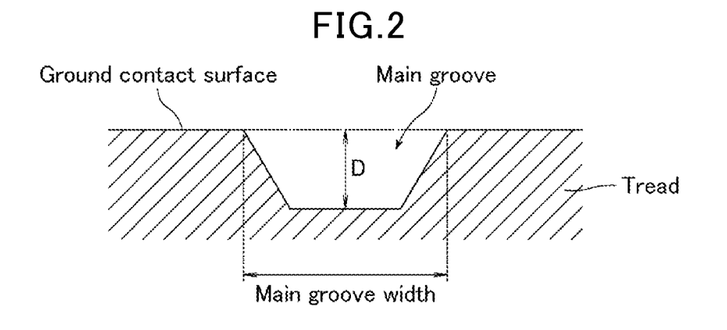
FIG. 2 is a schematic view of a main groove.

Herein, the term "main groove depth" is measured relative to a plane (ground contact surface) along which the tread is horizontal to the width direction, and refers to the distance between the deepest groove bottom and the ground contact surface (plane extending from the ground contact surface) along a perpendicular line drawn in the tire radial direction from a position one half the width of the main groove on the ground contact surface (plane extending from the ground contact surface). In FIG. 2, the main groove depth means the length D.

From the standpoint of overall performance in terms of wet grip performance and fuel economy, the width of the main groove 42 (main groove width: the width of the main groove in the tire width direction) of the tire 2 is preferably 16 mm or less, more preferably 14 mm or less, still more preferably 12 mm or less, but is preferably 6 mm or more, more preferably 7 mm or more, still more preferably 8 mm or more. The term "main groove width" refers to the maximum main groove width. For example, it is the width of the main groove width indicated in FIG. 2.

The tire 2 preferably has a largest total subtread thickness (hereinafter, also referred to as "maximum total subtread thickness") at the bottom of the main groove 42 (main groove bottom) of 0.5 to 2.0 mm, more preferably 0.6 to 1.8 mm, still more preferably 0.7 to 1.6 mm. Herein, the term "total subtread thickness at the main groove bottom" refers to a total tread thickness extending from the groove bottom surface 42a of the bottom of the main groove 42 to a cord layer (e.g., a band layer, a belt layer) disposed radially outermost in the tire. In the tire 2 of FIG. 1, it is the maximum total thickness of the tread 4 consisting of the base layer 28 and the cap layer 30, which extends from the groove bottom surface 42a to the band 18.

In FIG. 1, the symbol Ps denotes a point on the groove bottom surface 42a. The double-sided arrow Ts denotes the total thickness of the tread 4 measured at the point Ps on the main groove bottom (total subtread thickness at the main groove bottom). The total thickness Ts (total subtread thickness at the main groove bottom) is the sum of the thicknesses of the cap and base layers 30 and 28 measured at the point Ps. The total thickness Ts is measured along the normal of the groove bottom surface 42a at the point Ps. FIG. 1 shows an example of a two-layered tread 4 consisting of a cap layer 30 and a base layer 28; however, in the case of a monolayer tread 4, the total subtread thickness Ts at the main groove bottom is the thickness of the monolayer tread measured at the point Ps, while in the case of a three or more layered tread, the total subtread thickness Ts at the main groove bottom is the sum of the thicknesses of the three or more layers measured at the point Ps, wherein the total subtread thickness Ts at the point Ps on the main groove bottom is also measured along the normal of the groove bottom surface 42a at the point Ps.

EXAMPLES

The present invention is specifically described with reference to, but not limited to, examples.

Synthesis Example 1 (Synthesis of Conjugated Diene Polymer

A catalyst composition (molar ratio of iodine atom/lanthanoid-containing compound: 2.0) was previously prepared by reacting and aging 0.90 mmol of 1,3-butadiene with a cyclohexane solution containing 0.18 mmol of neodymium versatate, a toluene solution containing 3.6 mmol of methylalumoxane, a toluene solution containing 6.7 mmol of diisobutylaluminum hydride, and a toluene solution containing 0.36 mmol of trimethylsilyl iodide for 60 minutes at 30° C. Next, 2.4 kg of cyclohexane and 300 g of 1,3-butadiene were introduced into a 5 L autoclave purged with nitrogen. Then, the catalyst composition was introduced into the autoclave, and a polymerization reaction was performed for two hours at 30° C. to give a polymer solution. The reaction conversion rate of the introduced 1,3-butadiene was almost 100%.

Production Example 1 (Synthesis of Modified Conjugated Diene Polymer)

A modified conjugated diene polymer (hereinafter, also referred to as "modified polymer") was prepared by treating the polymer solution of the conjugated diene polymer prepared in Synthesis Example 1 as follows. To the polymer solution maintained at 30° C. was added a toluene solution containing 1.71 mmol of 3-glycidoxypropyltrimethoxysilane, and they were reacted for 30 minutes to give a reaction solution. To the reaction solution was then added a toluene solution containing 1.71 mmol of 3-aminopropyltriethoxysilane, and they were stirred for 30 minutes. Subsequently, to the resulting reaction solution was added a toluene solution containing 1.28 mmol of tetraisopropyl titanate, followed by stirring for 30 minutes. Then, the polymerization reaction was stopped by adding a methanol solution containing 1.5 g of 2,4-di-tert-butyl-p-cresol. The resulting solution was used as a modified polymer solution. The yield was 2.5 kg. To the modified polymer solution was then added 20 L of an aqueous solution with a pH of 10 adjusted with sodium hydroxide, followed by performing a condensation reaction at 110° C. for two hours while removing the solvent. Thereafter, the product was dried using a roll at 110° C. to obtain a dry product which was used as a modified polymer (modified BR).

The modified polymer (modified BR) thus prepared had a cis-1,4-bond content of 99.2% by mass, a 1,2-vinyl bond content of 0.21% by mass, a Mooney viscosity ($ML_{1+4}$, 125° C.) of 46, a molecular weight distribution (Mw/Mn) of 2.4, a cold flow value of 0.3 mg/min, a temporal stability of 2, and a glass transition temperature of −106° C.

The properties of the polymer were measured by the methods described below.

[Cis-1,4 Bond Content, 1,2-Vinyl Bond Content]

The cis-1,4 bond content and 1,2-vinyl bond content were determined by $^1$H-NMR and $^{13}$C-NMR analyses. The NMR analyses were carried out using "EX-270 (trade name)" available from Jeol Ltd. Specifically, in the $^1$H-NMR analysis, the ratio between 1,4-bonds and 1,2-bonds of the polymer was calculated from the signal intensities at 5.30-5.50 ppm (1,4-bond) and at 4.80-5.01 ppm (1,2-bond). Also, in the 13C-NMR analysis, the ratio between cis-1,4 bonds and trans-1,4 bonds of the polymer was calculated from the signal intensities at 27.5 ppm (cis-1,4 bond) and at 32.8 ppm (trans-1,4 bond). The calculated ratios were used to determine the cis-1,4 bond content (% by mass) and 1,2-vinyl bond content (% by mass).

[Mooney Viscosity ($ML_{1+4}$, 125° C.)]

The Mooney viscosity was measured at a temperature of 125° C. in accordance with JIS K 6300 using an L-type rotor with a preheating time of one minute and a rotor operation time of four minutes.

[Molecular Weight Distribution (Mw/Mn)]

The molecular weight distribution was determined using a gel permeation chromatograph (trade name: HLC-8120GPC, Tosoh Corporation) and a differential refractometer as a detector under the following conditions and calibrated with polystyrene standards.

Column: two "GMHHXL" (trade name) columns available from Tosoh Corporation

Column temperature: 40° C.

Mobile phase: tetrahydrofuran, Flow rate: 1.0 mL/min

Sample concentration: 10 mg/20 mL

[Cold Flow Value]

The cold flow value was measured by extruding the polymer through a ¼ inch orifice at a pressure of 3.5 lb/in$^2$ and a temperature of 50° C. After allowing 10 minutes for the polymer to reach steady state, the rate of extrusion was measured and reported in milligrams per minute (mg/min).

[Temporal Stability]

The temporal stability was determined by measuring Mooney viscosity ($ML_{1+4}$, 125° C.) after storage in a thermostatic bath at 90° C. for two days, and using it in the expression below. A smaller value indicates better temporal stability. Expression: [the Mooney viscosity ($ML_{1+4}$, 125° C.) after storage in a thermostatic bath at 90° C. for two days]−[the Mooney viscosity ($ML_{1+4}$, 125° C.) measured immediately after the synthesis]

[Glass Transition Temperature]

The glass transition temperature was defined as the glass transition onset temperature measured at a temperature increase rate of 10° C./min using a differential scanning calorimeter (Q200, TA Instruments Japan) in accordance with JIS K 7121.

The chemicals used in the examples and comparative examples are listed below.

NR: TSR 20 (SP value: 8.1)
SBR: Nipol NS612 (S-SBR, SP value: 8.5) available from Zeon Corporation
Modified BR: modified Nd-catalyzed BR synthesized in Production Example 1
Carbon black: Seast N220 ($N_2SA$: 111 $m^2/g$, DBP oil absorption: 115 mL/100 g) available from Mitsubishi Chemical Corporation
Silica: ULTRASIL VN3 ($N_2SA$: 172 $m^2/g$) available from Evonik Degussa
Silane coupling agent: Si266 available from Evonik Degussa
Oil: DIANA PROCESS NH-70S (aromatic process oil) available from Idemitsu Kosan Co., Ltd.
Coumarone-indene resin: Nitto Resin Coumarone V-120 (softening point: 120° C., hydroxy value: 30 mg KOH/g, SP value: 9.1) available from Nitto Chemical Co., Ltd.
Farnesene polymer: L-FBR-742 (liquid farnesene-butadiene copolymer, SP value: 8.1) available from Kuraray Co., Ltd.
Wax: Ozoace 0355 available from Nippon Seiro Co., Ltd.
Antioxidant 6C: NOCRAC 6C (N-phenyl-N'-(1,3-dimethylbutyl)-p-phenylenediamine) (6PPD) available from Ouchi Shinko Chemical Industrial Co., Ltd.
Antioxidant RD: ANTAGE RD (2,2,4-trimethyl-1,2-dihydroquinoline polymer) available from Kawaguchi Chemical Industry Co., Ltd.
Stearic acid: KIRI available from NOF Corporation
Amide compound: WB16 (mixture of fatty acid calcium salt, fatty acid amide, and fatty acid amide ester, ash content: 4.5%) available from Struktol
Zinc oxide: Zinc oxide #2 available from Mitsui Mining δ Smelting Co., Ltd.
Sulfur: HK200-5 (5% oil-containing powdered sulfur) available from Hosoi Chemical Industry Co., Ltd.
Vulcanization accelerator CZ: NOCCELER CZ (N-cyclohexyl-2-benzothiazolylsulfenamide) available from Ouchi Shinko Chemical Industrial Co., Ltd.
Vulcanization accelerator DPG: NOCCELER D (diphenylguanidine) available from Ouchi Shinko Chemical Industrial Co., Ltd.

Examples and Comparative Examples (Preparation of Mixture)

Mixtures were prepared by kneading a rubber component (NR or SBR) and a polymer component (coumarone-indene resin or farnesene polymer) in the amounts indicated in the "Mixture" field of each table at about 150° C. for five minutes using a 1.7 L Banbury mixer available from Kobe Steel, Ltd.

The materials other than the sulfur and vulcanization accelerators in the amounts indicated in each table were kneaded at about 150° C. for five minutes using a 1.7 L Banbury mixer (Kobe Steel, Ltd.) to give a kneaded mixture. Then, the sulfur and vulcanization accelerators were added to the kneaded mixture, and they were kneaded at about 80° C. for three minutes using an open roll mill to give an unvulcanized rubber composition. The unvulcanized rubber composition was formed into a tread shape and assembled with other tire components in a tire building machine to build an unvulcanized tire. The unvulcanized tire was vulcanized at 160° C. for 20 minutes to prepare a test tire (tire size: 215/45R17 SUMMER, passenger car tire (maximum total tread thickness: 11.5 mm, main groove depth: 10.5 mm, main groove width: 9.0 mm, total subtread thickness at main groove bottom: 1.0 mm)).

The test tires prepared as above were evaluated for the following items, and the overall performance in terms of wet grip performance and fuel economy was also determined. The tables show the results. It should be noted that Comparative Examples 1-1 and 2-1 are used as standards of comparison in Tables 1 and 2, respectively.

[Tan δ Versus Temperature Curve]

Figure 3:
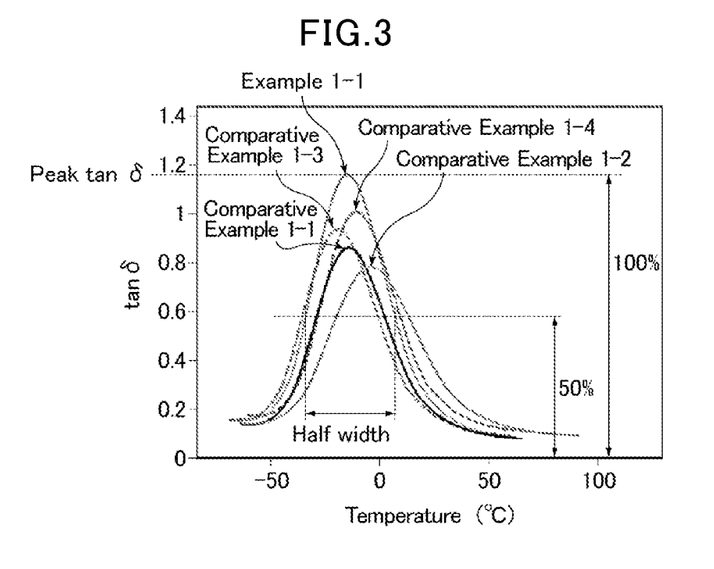
FIG. 3 shows exemplary tan δ versus temperature curves of rubber compositions.

A tan δ versus temperature curve of the (vulcanized) tread rubber cut out of each test tire was determined using a viscoelastic spectrometer (Iwamoto Seisakusho Co., Ltd.) at a frequency of 10 Hz, an initial strain of 10%, an amplitude of +0.25%, and a temperature increase rate of 2° C./min over a temperature range from −120° C. to 70° C. The peak tan δ, the half width, and the peak tan δ/half width ratio were determined from the tan δ versus temperature curve. FIG. 3 shows the tan δ versus temperature curves of Example 1-1 and Comparative Examples 1-1 to 1-4 as representative examples, with the peak tan δ and half width of Example 1-1.

[Wet Grip Performance]

The test tires were mounted on each wheel of a front-engine, front-wheel-drive car of 2000 cc displacement made in Japan. The braking distance of the car with an initial speed of 100 km/h on wet asphalt was determined and expressed as an index (wet grip performance index) relative to the standard comparative example (=100). A higher index indicates a shorter braking distance and therefore better wet grip performance.

[Fuel Economy (Rolling Resistance)]

The rolling resistance of the test tires was measured using a rolling resistance tester by running the test tires mounted on a 15×6JJ rim at an internal pressure of 230 kPa, a load of 3.43 kN, and a speed of 80 km/h. The rolling resistances are expressed as an index relative to the standard comparative example (=100). A higher index is better (better fuel economy).

TABLE 1

| | | Example | | | | | Comparative Example | | | |
|---|---|---|---|---|---|---|---|---|---|---|
| | | 1-1 | 1-2 | 1-3 | 1-4 | 1-5 | 1-1 | 1-2 | 1-3 | 1-4 |
| Formulation (parts by mass) | Mixture (NR/Farnesene polymer) | NR (25 parts)/ Farnesene polymer (10 parts) | NR (25 parts)/ Farnesene polymer (7.5 parts) | NR (25 parts)/ Farnesene polymer (12 parts) | NR (25 parts)/ Farnesene polymer (14 parts) | NR (25 parts)/ Farnesene polymer (8.5 parts) | — | — | — | — |
| | Mixture (SBR/Coumarone-indene resin) | SBR (60 parts)/ Coumarone-indene resin (7.5 parts) | SBR (60 parts)/ Coumarone-indene resin (10 parts) | SBR (60 parts)/ Coumarone-indene resin (5.5 parts) | SBR (60 parts)/ Coumarone-indene resin (3.5 parts) | SBR (60 parts)/ Coumarone-indene resin (9 parts) | — | — | — | — |
| | NR | — | — | — | — | — | 25 | 25 | 25 | 25 |
| | SBR | — | — | — | — | — | 60 | 60 | 60 | 60 |
| | Modified BR | 15 | 15 | 15 | 15 | 15 | 15 | 15 | 15 | 15 |
| | Carbon black | 10 | 10 | 10 | 10 | 10 | 10 | 10 | 10 | 10 |
| | Silica | 60 | 60 | 60 | 60 | 60 | 60 | 70 | 60 | 60 |
| | Silane coupling agent | 4 | 4 | 4 | 4 | 4 | 4 | 4 | 4 | 4 |
| | Oil | 2.5 | 2.5 | 2.5 | 2.5 | 2.5 | 20.0 | 25.0 | 10.0 | 12.5 |
| | Coumarone-indene resin | — | — | — | — | — | — | — | — | 7.5 |
| | Farnesene polymer | — | — | — | — | — | — | — | 10 | — |
| | Wax | 1.5 | 1.5 | 1.5 | 1.5 | 1.5 | 1.5 | 1.5 | 1.5 | 1.5 |
| | Antioxidant 6C | 2 | 2 | 2 | 2 | 2 | 2 | 2 | 2 | 2 |
| | Antioxidant RD | 0.5 | 0.5 | 0.5 | 0.5 | 0.5 | 0.5 | 0.5 | 0.5 | 0.5 |
| | Stearic acid | 1.5 | 1.5 | 1.5 | 1.5 | 1.5 | 1.5 | 1.5 | 1.5 | 1.5 |
| | Amide compound | 2 | 2 | 2 | 2 | 2 | 2 | 2 | 2 | 2 |
| | Zinc oxide | 1.5 | 1.5 | 1.5 | 1.5 | 1.5 | 1.5 | 1.5 | 1.5 | 1.5 |
| | Sulfur | 2.0 | 2.0 | 2.0 | 2.0 | 2.0 | 2.0 | 2.0 | 2.0 | 2.0 |
| | Vulcanization accelerator CZ | | | | | | | | | |
| | Vulcanization accelerator DPG | 2.0 | 2.0 | 2.0 | 2.0 | 2.0 | 2.0 | 2.0 | 2.0 | 2.0 |
| Properties | Peak tan δ | 1.16 | 1.19 | 1.13 | 1.11 | 1.18 | 0.86 | 0.78 | 0.93 | 1.01 |
| | Half width (° C.) | 41 | 42 | 40 | 40 | 42 | 40 | 52 | 42 | 44 |
| | Tan δ peak | −14 | −12 | −16 | −18 | −13 | −14 | −4 | −19 | −11 |

TABLE 1-continued

| | | Example | | | | | Comparative Example | | | |
|---|---|---|---|---|---|---|---|---|---|---|
| | | 1-1 | 1-2 | 1-3 | 1-4 | 1-5 | 1-1 | 1-2 | 1-3 | 1-4 |
| | temperature (° C.) Peak tan δ/ Half width | 0.028 | 0.028 | 0.028 | 0.028 | 0.028 | 0.022 | 0.015 | 0.022 | 0.023 |
| Evaluation | (a) Wet grip performance | 119 | 123 | 117 | 115 | 121 | 100 | 111 | 99 | 121 |
| | (b) Fuel economy | 100 | 97 | 101 | 102 | 98 | 100 | 82 | 100 | 84 |
| | Overall performance (=(a) + (b)) | 219 | 220 | 218 | 217 | 219 | 200 | 193 | 199 | 205 |

TABLE 2

|  |  | Example | | Comparative |
|---|---|---|---|---|
|  |  | 2-1 | 2-2 | Example 2-1 |
| Formulation (parts by mass) | Mixture (NR/Farnesene polymer) | NR (30 parts)/ Farnesene polymer (10 parts) | NR (30 parts)/ Farnesene polymer (7.5 parts) | — |
|  | Mixture (SBR/Coumarone-indene resin) | SBR (55 parts)/ Coumarone-indene resin (7.5 parts) | SBR (55 parts)/ Coumarone-indene resin (10 parts) | — |
|  | NR | — | — | 30 |
|  | SBR | — | — | 55 |
|  | Modified BR | 15 | 15 | 15 |
|  | Carbon black | 10 | 10 | 10 |
|  | Silica | 60 | 60 | 60 |
|  | Silane coupling agent | 4 | 4 | 4 |
|  | Oil | 2.5 | 2.5 | 20.0 |
|  | Coumarone-indene resin | — | — | — |
|  | Farnesene polymer | — | — | 1 |
|  | Wax | 1.5 | 1.5 | 1.5 |
|  | Antioxidant 6C | 2 | 2 | 2 |
|  | Antioxidant RD | 0.5 | 0.5 | 0.5 |
|  | Stearic acid | 1.5 | 1.5 | 1.5 |
|  | Amide compound | 2 | 2 | 2 |
|  | Zinc oxide | 2 | 2 | 2 |
|  | Sulfur | 1.5 | 1.5 | 1.5 |
|  | Vulcanization accelerator CZ | 2.0 | 2.0 | 2.0 |
|  | Vulcanization accelerator DPG | 2.0 | 2.0 | 2.0 |
| Properties | Peak tan $\delta$ | 1.11 | 1.13 | 0.82 |
|  | Half width (° C.) | 43 | 44 | 42 |
|  | Tan $\delta$ peak temperature (° C.) | −17 | −15 | −17 |
|  | Peak tan $\delta$/Half width | 0.026 | 0.026 | 0.020 |
| Evaluation | (a) Wet grip performance | 119 | 121 | 100 |
|  | (b) Fuel economy | 100 | 95 | 100 |
|  | Overall performance (=(a) + (b)) | 219 | 216 | 200 |

As shown in Tables 1 and 2, the examples having a tan $\delta$ versus temperature curve whose peak tan $\delta$ and half width satisfied relationship (1) and which had a sharp shape with a relatively high peak tan $\delta$ and a relatively small half width exhibited superior overall performance in terms of wet grip performance and fuel economy as compared to the comparative examples not satisfying relationship (1). Furthermore, a comparison between Example 1-1 and Comparative Examples 1-1, 1-3, and 1-4 in Table 1 revealed that the overall performance was significantly and synergistically improved with a combination of a coumarone-indene resin and a farnesene polymer.

REFERENCE SIGNS LIST

2 Pneumatic tire
4 Tread
14 Carcass
16 Belt
18 Band
20 Innerliner
24 Tread surface
26 Groove
28 Base layer
30 Cap layer
42 Main groove
42a Groove bottom surface
P Point on tread surface 24
T Thickness of tread 4
Ps Point on groove bottom surface 42a
Ts Total subtread thickness at main groove bottom
D Main groove depth

The invention claimed is:

1. A tire rubber composition, comprising, based on 100% by mass of total rubber components therein, 25% by mass or more of an isoprene-based rubber and 35% by mass or more of a styrene-butadiene rubber, and having a tan $\delta$ versus temperature curve whose peak tan $\delta$ and half width satisfy the following relationship (1):

Peak tan $\delta$/Half width≥0.025     (1).

2. The tire rubber composition according to claim 1, wherein the rubber composition satisfies the following relationship:

0.025≤Peak tan $\delta$/Half width≤0.100.

3. The tire rubber composition according to claim 1, wherein the rubber composition satisfies the following relationship:

0.027≤Peak tan $\delta$/Half width≤0.080.

4. The tire rubber composition according to claim 1, wherein the rubber composition comprises a farnesene polymer.

5. The tire rubber composition according to claim 1, wherein the rubber composition comprises a coumarone-indene resin.

6. A pneumatic tire, comprising the rubber composition according to claim 1.

7. The pneumatic tire according to claim 6, wherein the tire has a maximum total tread thickness of 5 mm or more.

8. The pneumatic tire according to claim 6, wherein the tire has a main tread groove depth of 8.0 to 13.0 mm.

9. The pneumatic tire according to claim 6,
wherein the tire has a main tread groove width of 6 to 16 mm.

10. The pneumatic tire according to claim 6,
wherein the tire has a maximum total subtread thickness at a main groove bottom of 0.5 to 2.0 mm.

* * * * *